United States Patent
Singh

(10) Patent No.: US 10,441,926 B2
(45) Date of Patent: Oct. 15, 2019

(54) FLUID TREATMENT APPARATUS AND PROCESS

(71) Applicant: Ashok Adrian Singh, Johannesburg (ZA)

(72) Inventor: Ashok Adrian Singh, Johannesburg (ZA)

( * ) Notice: Subject to any disclaimer, the term of this patent is extended or adjusted under 35 U.S.C. 154(b) by 250 days.

(21) Appl. No.: 15/029,455

(22) PCT Filed: Oct. 14, 2014

(86) PCT No.: PCT/IB2014/065286
§ 371 (c)(1),
(2) Date: Apr. 14, 2016

(87) PCT Pub. No.: WO2015/056159
PCT Pub. Date: Apr. 23, 2015

(65) Prior Publication Data
US 2016/0271573 A1    Sep. 22, 2016

(30) Foreign Application Priority Data
Oct. 17, 2013 (ZA) .................................. 2013/07734

(51) Int. Cl.
*B01F 5/04* (2006.01)
*C22B 7/00* (2006.01)
(Continued)

(52) U.S. Cl.
CPC ........ *B01F 5/0416* (2013.01); *B01F 3/04503* (2013.01); *B01F 5/0065* (2013.01);
(Continued)

(58) Field of Classification Search
CPC .... C22B 3/02; C22B 3/12; C22B 3/22; C22B 11/04; C22B 11/08; C22B 7/008;
(Continued)

(56) References Cited

U.S. PATENT DOCUMENTS 3,790,369 A    2/1974   Olsson et al.
4,116,488 A    9/1978   Hsueh et al.
(Continued)

FOREIGN PATENT DOCUMENTS

AU    2361888 A    6/1989
CN    102491485 A  6/2012
(Continued)

OTHER PUBLICATIONS

SU 1428438 A. Machine translation. (Year: 1988).*
(Continued)

*Primary Examiner* — Tima M. McGuthry-Banks
(74) *Attorney, Agent, or Firm* — Fitch, Even, Tabin & Flannery LLP

(57) ABSTRACT

Liquid treatment apparatus comprises at least two chambers being first and second chambers through which a fluid can flow. The two chambers are separated by at least one choke nozzle which has an entrance in the first chamber and an exit in the second chamber. The choke nozzle (1) comprises a converging section at its entrance (3), a throat section (4), a backward-facing step (5) immediately after the throat section (4), and an exit section at its exit (6) wherein the exit section (6) diverges from the step (5). Similarly constructed mixing nozzles (1) may be included in the apparatus. The apparatus is especially useful in processes requiring a gas to be entrained in a fluid so that the gas is in the form of very small bubbles that do not tend to coalesce and flash off such as in the dissolution of gold and other precious metals from ore in the removal of arsenic from an ore.

11 Claims, 7 Drawing Sheets

(51) Int. Cl.
  *B01J 19/26* (2006.01)
  *C22B 3/02* (2006.01)
  *C22B 11/08* (2006.01)
  *B01F 3/04* (2006.01)
  *B01F 5/00* (2006.01)
  *C22B 3/12* (2006.01)
  *C22B 3/22* (2006.01)
  *B01F 5/06* (2006.01)
  *C22B 3/00* (2006.01)
  *B03D 1/24* (2006.01)

(52) U.S. Cl.
  CPC ............ *B01F 5/048* (2013.01); *B01F 5/0421* (2013.01); *B01F 5/0423* (2013.01); *B01F 5/0428* (2013.01); *B01F 5/0473* (2013.01); *B01F 5/064* (2013.01); *B01J 19/26* (2013.01); *C22B 3/02* (2013.01); *C22B 3/12* (2013.01); *C22B 3/22* (2013.01); *C22B 7/008* (2013.01); *C22B 11/04* (2013.01); *C22B 11/08* (2013.01); *B01F 2215/0422* (2013.01); *B03D 1/242* (2013.01); *Y02P 10/234* (2015.11)

(58) Field of Classification Search
  CPC .. B01F 5/0416; B01F 5/0065; B01F 3/04503; B01F 5/0323; B01F 5/0421; B01J 19/26
  See application file for complete search history.

(56) References Cited

U.S. PATENT DOCUMENTS

| | | |
|---|---|---|
| 4,162,970 A | 7/1979 | Zlokarnik |
| 4,224,158 A | 9/1980 | Molvar |
| 4,342,425 A | 8/1982 | Vickers |
| 4,537,686 A | 8/1985 | Borbely et al. |
| 5,298,198 A | 3/1994 | LaCross |
| 5,645,771 A | 7/1997 | Sethna et al. |
| 6,042,089 A | 3/2000 | Klein |
| 6,482,250 B1 | 11/2002 | Williams et al. |
| 7,237,574 B2 | 7/2007 | Chipman et al. |
| 2006/0027100 A1 | 2/2006 | Kozyuk |
| 2006/0065869 A1 | 3/2006 | Chipman et al. |
| 2009/0213687 A1 | 8/2009 | Linga et al. |
| 2010/0307977 A1 | 12/2010 | Singh |
| 2012/0186672 A1 | 7/2012 | Fisenko |
| 2012/0222744 A1 | 9/2012 | Maslak et al. |
| 2012/0271597 A1* | 10/2012 | Pearson ................ C22B 3/02 703/1 |

FOREIGN PATENT DOCUMENTS

| | | | |
|---|---|---|---|
| CN | 102660675 | * | 9/2012 |
| CN | 203030423 U | | 7/2013 |
| DE | 3741843 A1 | | 6/1989 |
| GB | 2189170 A | | 10/1987 |
| JP | 58-221240 A | | 12/1983 |
| JP | 7-241494 A | | 9/1995 |
| JP | H08336755 A | | 12/1996 |
| JP | H10099728 A | | 4/1998 |
| JP | 2008173628 A | | 7/2008 |
| JP | 2010502468 A | | 1/2010 |
| JP | 2011161390 A | | 8/2011 |
| RU | 2359763 C1 | | 6/2009 |
| SU | 1428438 A | * | 10/1988 |
| WO | 88/06493 A1 | | 9/1988 |
| WO | 88/06493 A1 | | 9/1998 |
| WO | 2006/081611 A1 | | 8/2006 |

OTHER PUBLICATIONS

CN 102660675 machine translation (Year: 2012).*
"Reynolds Number and Pipe Flow." Turbulent Flow, MIT, Nov. 10, 2010. (Year: 2010).*
SU 128932 A1 human translation (Year: 1988).*
International Search Report dated Jan. 5, 2015 for PCT/IB2014/065286.
Written Opinion dated Jan. 5, 2015 for PCT/IB2014/065286.
Third Party Observation date of submission Feb. 17, 2016 for PCT/IB2014/065286.
Chinese Office Action dated Jan. 22, 2017, for Chinese Patent Application No. 201480057235.2. (12 pages).
JPO; Application No. 2016-548445; Notice of reasons for refusal dated Jun. 29, 2018.
Extended European Search Report dated Jan. 24, 2018. issued in corresponding European Patent Application No. 14854794.6. (9 pages).
Russian Patent Office; Application No. 2016118794102; Office Action dated Dec. 10, 2018.
"Content and Mathematical Presentation of Events in Hydraulic System with a Cathetic and Resonator," Sep. 26, 2010.
JPO; Application No. 2016-548445; Office Action dated Apr. 2, 2019.

* cited by examiner

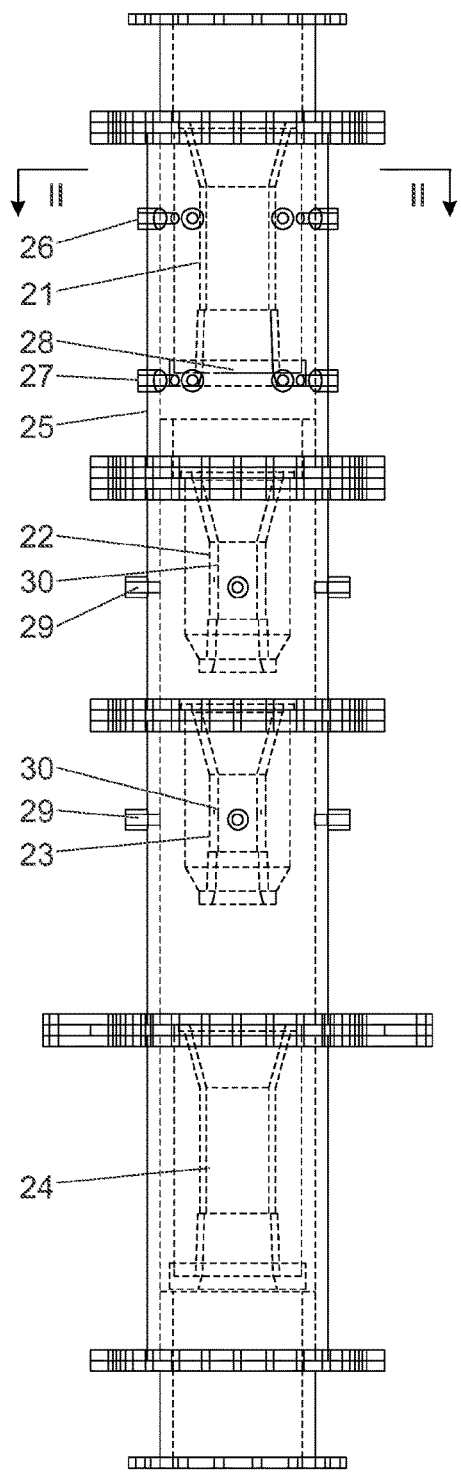
Figure 3
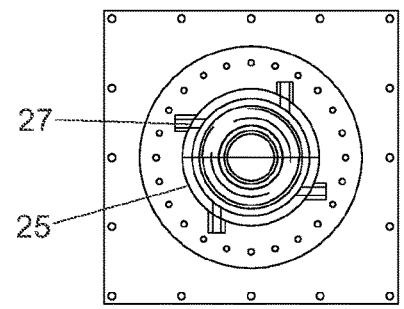
Figure 4
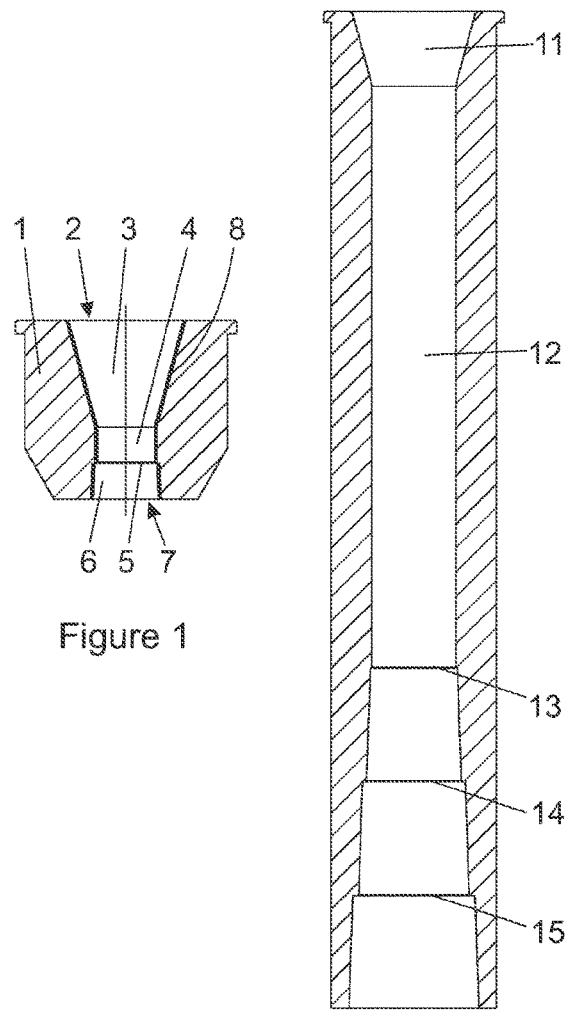
Figure 1
Figure 2

FLUID TREATMENT APPARATUS AND PROCESS

CROSS-REFERENCE TO RELATED APPLICATIONS

This application is a U.S. National Phase Patent Application of International Patent Application Number PCT/IB2014/065286, filed on Oct. 14, 2014, which claims priority of South African Patent Application Number 2013/07734, filed Oct. 17, 2013, which are hereby incorporated herein by reference in their entirety.

FIELD OF THE INVENTION

The invention relates to fluid treatment apparatus for treating a fluid medium including a slurry or pulp and, more particularly, to an apparatus and process for enhancing chemical or physical reactions occurring in processes by utilizing choked flow and may provide associated hydraulic cavitation.

Application of the invention includes not only reactions and processes that take place in a single or multiple fluid phase but also those in which one or more fluids and a gas are contacted such as in a process in which a liquid and at least a component of the gas partake in a physical or chemical reaction. Application of the invention thus extends to chemical extraction processes such as the extraction of precious metals including gold in which a slurry or pulp and an oxidizing gas are mixed and subjected to choked flow; the destruction of cyanide to lower levels of residual cyanide in waste process solutions pulps and slurries; and the removal of arsenic from process solutions, pulps and slurries.

Numerous other chemical and physical reactions that take place in processes which can benefit from utilizing choked flow as provided by this invention will doubtless fall within the scope hereof.

BACKGROUND OF THE INVENTION

Cyanide is commonly used as a lixiviant to extract gold and other precious metals from ore. Milled ore is mixed with a liquid such as water to form a slurry or pulp, to which calcium cyanide or sodium cyanide is then added. An oxidizing agent is required for the dissolution of gold and other metals, and atmospheric air is the customary source of oxygen gas for use as the oxidant, although oxygen gas is also sometimes used.

A problem occurs, however, in ensuring that the oxygen is sufficiently diffused within the slurry for oxidation to occur so as to recover the maximum amount of gold from the ore. There is a strong resistance to the mixing of air or other oxidizing chemical agents with the slurry, which may have a consistency of 50% or more solids, and as a result only a portion of the air in the form of bubbles dissolves in the slurry to provide for oxidation.

The most commonly used method for injecting oxygen into the slurry is to use a lance/nozzle arrangement to inject air or oxygen into a tank or vessel containing an agitator. The shear from the agitation is then used to disperse the gas within the tank. A disadvantage of this method, however, is that the shear and Reynolds Numbers generated from the mixing action of the agitator are relatively low. Large bubbles are thus created, which tend to quickly flash off, resulting in low gas hold-up, low dissolved gas levels and low utilization efficiencies.

Other methods involve pumping the slurry through a pipe with back-pressure and one of a gas injection through a pipe or a lance, gas injection through slots, and gas injection through porous media, in each case relying on the turbulence within the system to break down the gas into bubbles.

Although these systems generally work better than gas injection into an agitated tank, they have several disadvantages. For example, relative gas hold-up and utilization efficiencies are still relatively low; there is high wear requiring frequent change outs; and the gas to be injected has to be pressurized to above the back-pressure of the system.

Another method involves the use of venturis or eductors, which create a measure of suction to draw in the gas into the slurry. Disadvantages, however, are that the system is not under pressure; larger bubbles are created which can flash off; and the gas hold-up and gas utilization efficiencies are relatively low.

There is therefore a need for an alternative apparatus and process for, inter alia, promoting the diffusion of a gas into slurry or for generating hydraulic cavitation in a process fluid.

In this specification, a fluid is to be regarded as including a liquid substance which may also comprise solid material, such as a pulp or slurry as well as entrained gas bubbles or even air. The liquid may be water or any other liquid, and the solid material may include milled or crushed ore, heavy metals, water contaminants, effluent, sewage, cellulose and so forth.

SUMMARY OF THE INVENTION

According to the invention, there is provided fluid treatment apparatus comprising at least two chambers being first and second chambers through which a fluid can flow, the two chambers being separated by at least one choke nozzle which has an entrance in the first chamber and an exit in the second chamber, wherein the choke nozzle comprises a converging section at its entrance, a throat section, a backward-facing step immediately after the throat section, and an exit section at its exit which opens into the second chamber.

The choke nozzle is of the general nature of a venturi with the entrance, throat section and exit section each being of circular shape in cross-section and wherein the exit section preferably diverges.

The fluid treatment apparatus is especially configured to tolerate choked flow conditions through the choke nozzle. The diameter of the throat section of the choke nozzle is selected so as to choke the flow of fluid flowing through the choke nozzle under normal operating conditions. The design of the choke nozzle therefore varies according to the required volumetric flow rate and the properties of the liquid to be treated. Typically, more volatile liquids choke at a lower linear speed of as low as about 5 m/s whilst water and slurries in water choke at a much higher linear velocity in the region of about 25 m/s.

The chambers may be arranged with the first chamber vertically above the second chamber and wherein some additional choke nozzles or mixing nozzles can optionally be arranged in inlet or transfer passages with their axes generally horizontal as opposed to vertical.

The fluid treatment apparatus may include mixing nozzles for mixing fluids and especially gasses into a process fluid either before it enters a choke nozzle or after it leaves a choke nozzle, or both, and wherein the mixing nozzle has a converging section at its entrance, a throat section, a backward-facing step immediately after the throat section, and an exit section at its exit which opens into a downstream chamber. In the instance of water as the base fluid, a typical linear velocity through the mixing nozzle would typically be between 3 and 12 m/s, most preferably between 8 and 10 m/s The converging section of each nozzle may have a cone angle of from 1 to 35 degrees, more preferably of from 15 to 30 degrees; and most preferably about 30 degrees.

The backward-facing step may extend radially outwards beyond the throat section by a distance that generally depends, at least to some extent, on the throat diameter and, especially in the case of a choke nozzle, is about 3 to about 10% of the diameter of the throat, preferably 4 to 8%, and most preferably about 4.5-5%. In respect of smaller diameter throats this represents a step of about 1 to 4 mm, for example about 2 to 3 mm.

The exit section preferably diverges to serve as a diffuser section and may have a cone angle of from 1 to 8 degrees, more preferably of from 2 to 8 degrees, and most preferably of from 4 to 8 degrees. Even more preferably, the cone angle is about 4 degrees.

The apparatus may be arranged for diffusing a gas in a liquid (including a slurry or pulp) in which instance the second chamber may include one or more gas inlets, the inlet(s) being positioned with their axes extending transversely relative to the axis of the nozzle so that gas may be urged towards a flow that is generally tangential relative to the nozzle with a consequent swirling action.

An exit section to a nozzle may have additional successive backward-facing steps along the exit section.

The apparatus may be configured to be connected in fluid communication with a reactor for separating, purifying, leaching or oxidizing one or more constituents of the fluid.

The invention also provides apparatus comprising at least first, second and third chambers in which a first arrangement of a single choke nozzle or a row of more than one choke nozzle as described above extend from the floor of a first chamber into a second chamber; a fluid inlet leading into the first chamber, the fluid inlet being positioned transversely with respect to a direction of fluid flow through the choke nozzles; and a second arrangement of a single choke nozzle or a row of more than one choke nozzle as described above extends from a floor of the second chamber into the third chamber, wherein the entrances to the nozzles of the second and downstream arrangements are directly in line with the exits of the nozzles from an immediately upstream arrangement; a gas or fluid inlet leading into each of the second and third chambers, each inlet being positioned transversely with respect to the choke nozzles and in line with or slightly downstream of the nozzle exits; an optional fourth and additional chambers interconnected by arrangements of a single choke or mixing nozzle or a row of more than one choke or mixing nozzle as described above.

The apparatus may further include an additional chamber above or between successive chambers described above, the additional chamber having a generally tangential outlet through which the fluid can flow, the outlet being generally U-shaped so that fluid is returned tangentially into a chamber below that has a single choke nozzle or a row of more than one choke nozzle in its floor. One or more arrangements of choke nozzles as described above may be positioned in the inlet, preferably near to where the inlet enters the chamber below the additional chamber. Gas or fluid inlets may lead into the inlet immediately downstream of the exits of the nozzles in the inlet.

The invention also provides a process for enhancing chemical or physical reactions occurring in processes by utilizing choked flow, the method comprising passing a fluid through a choke nozzle comprising a converging section, a throat section, a backward-facing step immediately after the throat section and an exit section wherein the directional flow, angular velocity, centrifugal acceleration and straight line acceleration of the fluid create conditions providing choked flow through the choke nozzle.

The invention further provides a process for diffusing a gas in a fluid, the process comprising generating bubbles in the fluid that accelerates through the throat section and then causing the bubbles to implode and form multiple smaller bubbles. Implosion of the bubbles may occur in the exit section which is preferably a diverging section or in a region downstream of the choke nozzle. The process may additionally comprise the step of injecting a gas transversely and preferably generally tangentially into or onto a fluid jet which exits a nozzle at a point of fluid discharge, thereby entraining the injected gas in the fluid and imparting a swirling motion to the fluid.

The bubbles which are formed by the process of implosion are preferably less than 50 micrometer s in size; preferably less than 1 micrometer ; and even more preferably less than 1 nanometer , and are sufficiently small to be retained in the fluid.

A fluid jet exiting one nozzle may be directed into a nozzle immediately adjacent, and so on, thereby increasing opportunities within the process for implosion of bubbles and further cavitation.

The process may be part of a process for separating gold and other metals from ore, and more particularly, the process may be to ensure that oxygen or air is sufficiently diffused within a slurry of milled ore, water and calcium cyanide or sodium cyanide so as to sufficiently oxidize the ore for reduced cyanide consumption and/or improved metal leaching and/or to facilitate flotation of the gold particles from the ore.

The invention further provides a process for reducing the amount of cyanide in a cyanide-containing fluid, the process comprising the steps of adjusting the pH and Eh (oxygen reduction potential measured in mV) of the fluid in an apparatus as described above; and oxidizing cyanide in the fluid by carbon catalysis.

Adjusting the pH and Eh may be performed with an Eh modifier such as a combination of $SO_2$ and air or oxygen and a catalyst such as copper sulphate. Other Eh modifiers, such as peroxide, manganese dioxide, sodium hypochlorite, potassium permanganate, potassium dichromate or ozone may also be used. Oxidizing cyanide may be performed using activated carbon or activated charcoal. The process may be performed in a single vessel or in two or more vessels.

The fluid may contain arsenic or a derivative thereof and the process of the invention may be aimed at causing the arsenic to dissolve into the fluid; and thereafter precipitating the dissolved arsenic out of the fluid in a stable form. The fluid from which the arsenic has been precipitated may be subjected to a further treatment to remove a metal of value from the fluid.

In order that the above and other features of the invention may be more fully understood various embodiments of the invention will now be described with reference to the accompanying drawings.

BRIEF DESCRIPTION OF THE DRAWINGS

FIG. 1 is a sectional elevation of a choke nozzle which can be used in many different embodiments of the invention;

FIG. 2 is a similar sectional elevation of a mixing nozzle having multiple axially spaced backward-facing steps downstream of the throat section which can be used in many different embodiments of the invention;

FIG. 3 is an elevation of one embodiment of an apparatus according to the invention that is particularly aimed at enhancing gas diffusion within a fluid and showing two choke nozzles and two coaxial mixing nozzles in dotted lines;

FIG. 4 is a cross-sectional view of the apparatus shown in FIG. 1 taken along line II to II;

FIG. 18 is a graph showing the reduction in cyanide consumption in the test on which FIG. 17 is based; and, FIG. 19 is a graph showing results of a practical test for demonstrating the efficacy of the invention as applied to the dissolution of arsenic from a process solution.

DETAILED DESCRIPTION OF THE INVENTION

In the process of the invention in which a gas is to be dispersed in a fluid, the gas is injected into the fluid such that ultra-fine bubbles are formed, preferably below 1 micrometer in diameter and even more preferably in the picometer diameter range, such that the tiny bubbles behave like solid spheres in the liquid and do not coalesce or flash off. The creation of ultra-fine bubbles increases the gas hold-up in the fluid; increases the mass transfer of gas into fluid; accelerates chemical reactions; and facilitates the flotation of ultra-fine particles.

Although the invention is described herein in detail for the recovery of gold from ore and for the dissolution of oxygen into a slurry or pulp of milled ore, water and cyanide, it will be apparent to a person skilled in the art that the invention could have many other applications. These include the pre-oxidation of mineral pulps; accelerated leaching of various metal values in the minerals industry, e.g. gold, platinum group metals and base metals such as copper, cobalt, nickel, zinc, manganese and lead, as well as uranium; for partial or total sulphide oxidation of various minerals, e.g. in the treatment of refractory gold ore; for the destruction of cyanide and for arsenic remediation in the gold industry; for the treatment of acid mine drainage; for water treatment applications; for applications in the paper and pulp industry; for applications in the biodiesel industry; for conditioning and ultra-fine bubble generation in the flotation industry; and for gas scrubbing.

As mentioned above, one of the problems with existing methods for injecting gas into a liquid or suspension is the low linear velocities (under 10 m/s) inherent to these systems, which limits the shear and mixing and hence also the bubble size.

A predicted bubble size (diameter) for a fluid velocity of 10 m/s has been calculated to be between 80 and 100 micrometer s (microns). Even if it were possible to increase fluid velocities to 25 m/s, bubble size would still only be around 50 micrometer s.

The process of the present invention, on the other hand, results in the formation of bubbles which are smaller than 50 micrometer s, preferably in the nanometer or even picometer range. This can be achieved by initially generating bubbles in the 50 micrometer size range through shear, and subsequently imploding the bubbles down to nanometer or picometer range by harnessing the energy of cavitation.

Figure 9:
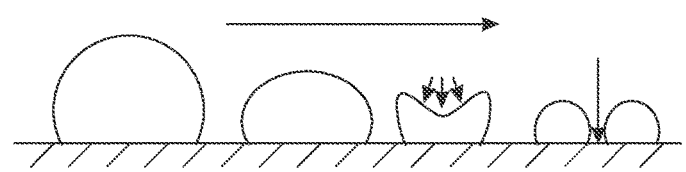
FIG. 9 is a schematic diagram of the progression of a cavitation bubble imploding close to a fixed surface generating a jet of the surrounding liquid.

Inertial cavitation is a process where a void or bubble in a liquid rapidly collapses, producing a shock wave (FIG. 9). Since the shock waves formed by cavitation are strong enough to significantly damage moving parts, cavitation is usually an undesirable phenomenon. However, in the present invention, conditions favorable for cavitation are deliberately created and the energy released during cavitation is harnessed and utilized to create nanometer or picometer size bubbles ("nano-bubbles" or "pico-bubbles"), to dissolve gases and to promote chemical reactions that would otherwise not occur or would occur very slowly (as free radicals are generated in the process due to disassociation of vapours trapped in the cavitating bubbles).

Hydrodynamic cavitation describes the process of vaporization, bubble generation and bubble implosion which occurs in a flowing liquid as a result of a decrease and subsequent increase in pressure. Cavitation will only occur if the pressure declines to a point below the saturated vapour pressure of the liquid. In pipe systems, cavitation typically occurs either as the result of an increase in the kinetic energy (through an area constriction) or an increase in the pipe elevation.

Hydrodynamic cavitation can be produced by passing a liquid through a constricted channel at a specific velocity or by mechanical rotation through a liquid. In the present invention, a constricted channel and the specific geometry of the system create a combination of pressure and kinetic energy enabling a hydrodynamic cavitation cavern downstream of the local constriction to generate high energy cavitation bubbles.

The process of bubble generation, subsequent growth and collapse of the cavitation bubbles results in very high energy densities, resulting in very high temperatures and pressures at the surface of the bubbles for a very short time. The overall liquid medium environment, therefore, remains at ambient conditions.

The invention may be implemented using a wide variety of different choke nozzles and mixing nozzles in which gas bubbles are formed in a fluid by accelerating the fluid through the choke nozzle one variety of which is shown in FIG. 1. The choke nozzle (1) has a fluid inlet (2), a convergent entry cone (3), a throat section (4) where the cross-sectional area of the choke nozzle is a minimum at the narrow end of the convergent entry cone, a backward facing step (5) immediately downstream of the throat section, and a somewhat divergent exit cone or diffuser section (6) with a fluid outlet (7). The entry cone is angled at from about 10 to about 40 degrees, more particularly from about 15 to about 35 degrees, and even more particularly from about 25 to about 35 degrees, and most particularly at about 30 degrees.

The diameter of the throat section may be selected so as to choke the flow of fluid so that the velocity of any bubbles in the fluid becomes sonic in the throat section. The backward facing step (5) can have a step height of about 1 to about 4 mm, and more particularly of about 2 to about 4 mm in the instance of smaller diameter throats which h falls within the range of about 4.5-5% of the throat diameter. The diffuser section (6) has an angled wall with an included angle of from about 1 to about 9 degrees, more particularly of from about 2 to 8 degrees, and even more particularly of from about 4 to 8 degrees with a particular preference being about 4 degrees. The choke nozzle surface can be rough or pitted. The choke nozzle can be lined with a wear resistant material, such as fused or reaction bonded SiSiC, alumina, HDPE, polyurethane or rubber, a liner being indicated by numeral (8).

In use entrained gas is accelerated past the backward facing step (5), which creates high speed eddies and turbulence within the jet of fluid, resulting in ventilated void bubble formation with subsequent implosion. Bubble implosion is further assisted by the diverging angle of the diffuser section (6) which increases the local (static) pressure in the choke nozzle as the nozzle diameter increases. Depending on the gas, it may change phase and liquefy at the point of highest compression.

FIG. 2 of the drawings of the other hand illustrates a mixing nozzle that is very much elongated and the entry cone (11) of each mixing nozzle is as described above. The entry cone connects to a very much longer throat section (12), the length of which is equivalent to from about 3 to about 15, and more particularly from about 7 to about 15, diameters of the throat section. Immediately downstream of the throat section is a first backward facing step (13) with a step height in the range of about 2 to about 25 mm, and more particularly about 4 to about 25 mm. There can be a number of subsequent backward facing steps, in this instance two, additional backward facing steps (14, 15), axially spaced at distances equivalent to about 1 to about 10, and more particularly about 3 to about 10, diameters of the preceding backward facing step. The backward facing steps create a diffuser section with an included angle typically of from about 2 to about 30 degrees, and more particularly of from about 4 to about 30 degrees. The fluid velocity in the throat of the mixing nozzle may be between 3 and 12 m/s, most preferably between 8 and 10 m/s. The mixing nozzle may have a lining and be encased as described above.

In each instance, air or other gases, or even liquids, can be injected into the fluid at various points such as at the point of fluid discharge from the nozzle (assisted by the slight vacuum created by the fluid flow), where it further ventilates the voids and is broken down into small bubbles by the implosion of the voids in the highly turbulent region downstream of the nozzle. The break-up of the fluid greatly increases the contact area between the fluid and the gas to further enhance dissolution of oxygen in the fluid. The gas injection may be tangential and will then result in a swirling action of the fluid, so aiding mixing and generating centrifugal acceleration. Reagents may also be injected into the fluid at this point to ensure maximum mixing and reaction.

By accelerating the fluid through a choke nozzle described above, the angular velocity of the fluid can be around 240 000 rpm and the centrifugal acceleration can be around 60 000 g (g being the acceleration due gravity) at a point close to the centre of the exit of the choke nozzle (around 1 mm from the centre). This, coupled with the straight line acceleration (10 000 g) through the choke nozzle, creates extreme cavitation conditions within the choke nozzle with ventilated void bubbles spreading from the outer circumference (owing to the straight line acceleration) to the inner core (owing to the centrifugal acceleration).

Thus, nanometer and even picometer size bubbles can be generated by creating a vacuum bubble by accelerating the fluid to drop the instantaneous pressure to below the vapour pressure of the fluid, so creating a void bubble; ventilating the void bubble with a gas; and imploding the void bubble by increasing the instantaneous pressure to above the vapour pressure of the fluid to form a multitude of tiny bubbles of an enhanced size.

This acceleration is achieved by one or more of straight line acceleration through the choke nozzle from about 0.4 m/s to about 25 m/s to generate about 10 000 g (g being the acceleration due to gravity); centrifugal acceleration with angular velocities around 240 000 rpm to generate around 60 000 g at a point near the centre of the choke nozzle (around 1 mm from the centre); centrifugal acceleration of around 60 000 g as a result of eddy formation created by the backward facing steps in the choke nozzle; and, acceleration due to gravity by height difference (geodetic height).

The acceleration has the effect of "tearing" holes in the liquid to form voids which are ventilated and imploded. The void can seed on hydrophobic particles in the fluid, on existing microscopic voids already in the fluid, or on surface irregularities of the solid surfaces that provide "leading edges" for cavitation.

The overall effect of the fluid moving through the choke nozzle is that of an ultrahigh speed swirling jet with ultra-high speed eddies that cavitate from both its straight line as well as its centrifugal acceleration.

The turbulence within the fluid jet is also an important factor for facilitating gas entrainment as the free jet from one nozzle plunges into the receiving cup or entry cone section of a nozzle below.

Figure 12:
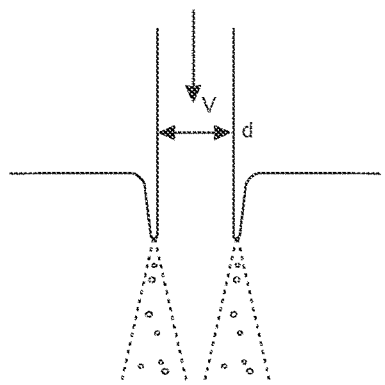
FIG. 12 shows a high velocity jet that exhibits how gas entrapment can occur through turbulence within a jet of fluid exiting a choke nozzle and through the shear layer surrounding the jet exiting the choke nozzle.

Referring to FIG. 12, the speed of the gas is subsonic as it is drawn into the choke nozzle, but it becomes sonic as it is compressed and passes through the point of narrowest diameter. As it passes into the region of the backward facing step where the diameter abruptly increases, the gas will expand and accelerate to supersonic speeds, generating a shock wave (sound wave) within the jet of fluid. This sound wave would have the effect of causing further cavitation in the jet and, in an extreme case, even breaking up the fluid into a coarse spray to greatly increase surface area for maximum contact with the surrounding gas. As gas is entrained and carried away by the fluid flow, more gas is drawn into the fluid creating a suction effect.

Although a pressurized gas would not necessarily be required for gas entrainment to take place, it would be preferred owing to the higher resultant gas velocities in the fluid and the possibility of generating supersonic gas flows through the nozzles.

Figure 10:
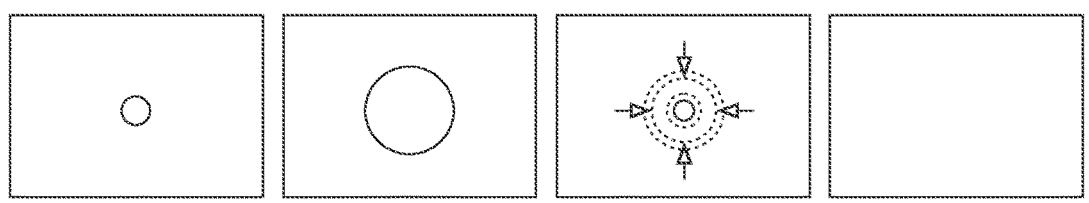
FIG. 10 is a schematic diagram showing how sonoluminescence develops in the direction from left to right.
Figure 11:
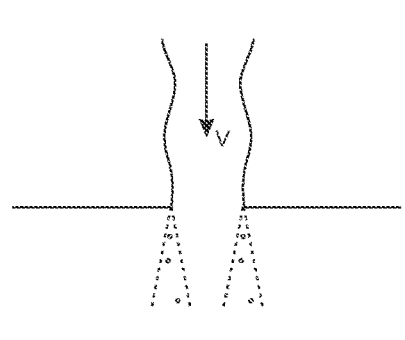
FIG. 11 shows a low velocity jet that exhibits intermittent gas entrainment.

Sonoluminescence may occur in the process of the present invention, owing to the shockwaves generated by the gas reaching supersonic speeds and the inertial cavitation in the diffuser sections of the nozzles. FIG. 10 shows the progression from left to right about the upper echelon of a bubble followed by slow expansion and thereafter quick and sudden contraction followed by the emission of light.

Reverting now to the practical implementation of the invention, FIGS. 3 and 4 show one arrangement in which a series of axially spaced nozzles (21, 22, 23, 24) are mounted coaxially in tubular apparatus (25). The first nozzle is a mixing nozzle (21) followed by two successive axially spaced choke nozzles (22, 23) with a final mixing nozzle (24). In this instance there are four tangential gas inlets (26) in the throat of the first mixing nozzle (21) and additional gas inlets (27) that are also tangentially arranged at the outlet (28) from the mixing nozzle (21).

The two choke nozzles (22, 23) each have four tangentially arranged inlets (29) to feed air or other fluid into the throat (30) of each choke nozzle. FIG. 4 shows clearly the tangential nature of the gas inlets.

Figure 5:
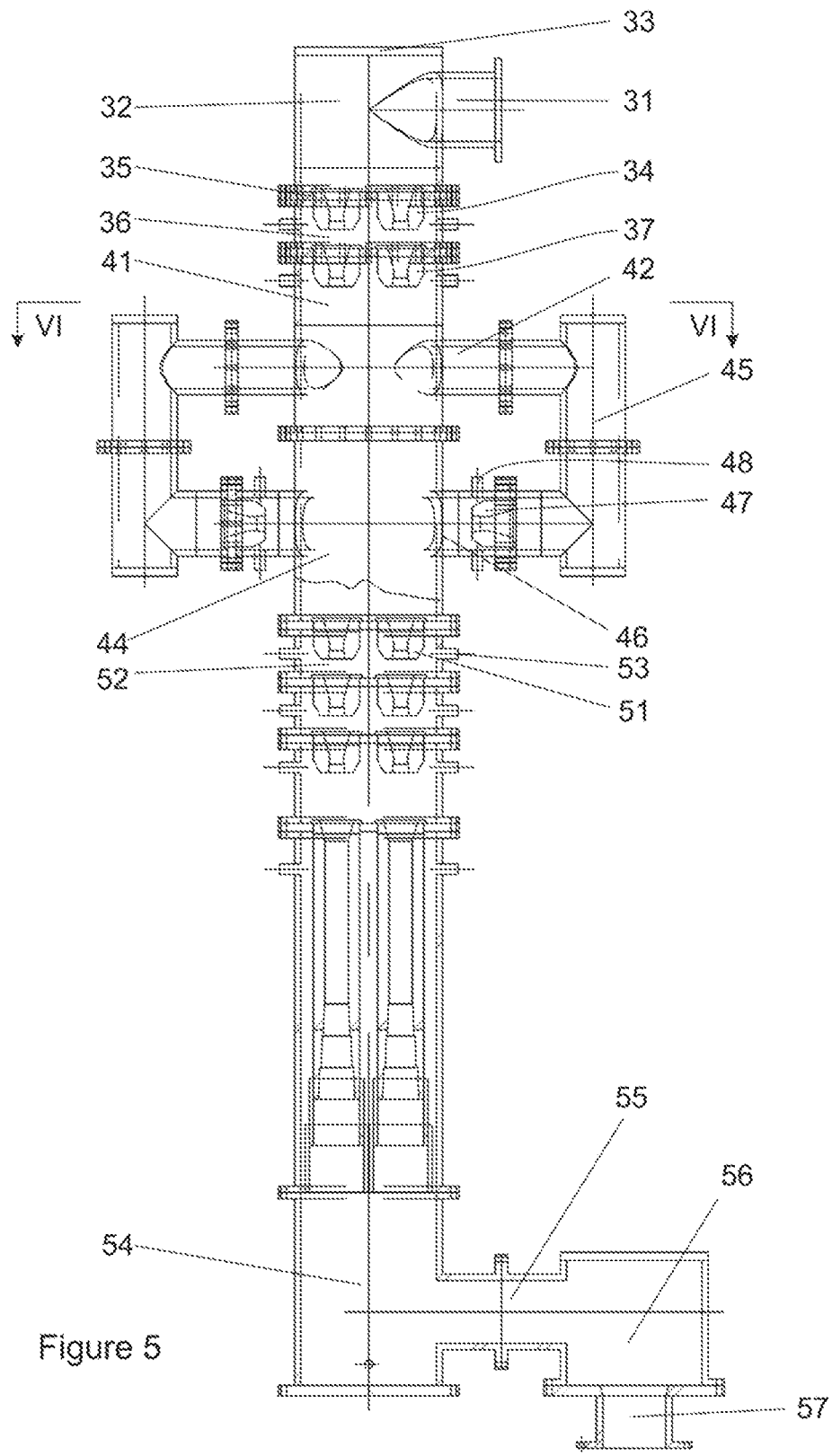
FIG. 5 is a schematic sectional elevation of an alternative embodiment of an apparatus according to the invention using additional arrangements of nozzles.
Figure 6:
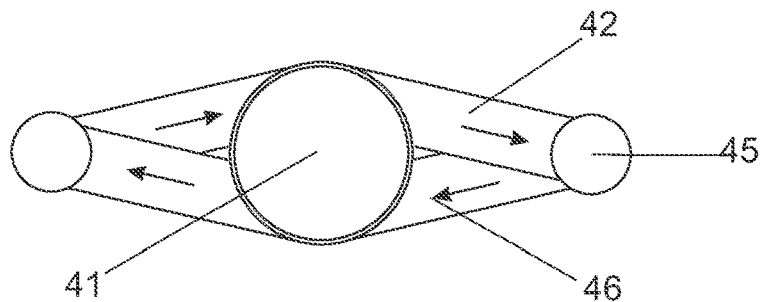
FIG. 6 is a schematic sectional plan view taken along line VI to VI of the embodiment of apparatus according to the invention shown in FIG. 5.

FIGS. 5 and 6 illustrate another arrangement of nozzles according to the invention in a more complex apparatus. In this arrangement the apparatus has a Tee type of inlet pipe (31) leading into a first chamber (32). The inlet pipe may have one or more points for pressure measurement and gas and/or liquid injection (not shown). The first chamber (32) is typically a vertical cylindrical pipe with a length of from about 0.3 m to about 1 m, more particularly from about 0.4 m to about 1 m, and even more particularly from about 0.6 m to about 1 m. The first chamber (32) and inlet pipe (31) can be manufactured from HDPE, steel lined with rubber, polyurethane or any other suitable material.

A roof section (33) of the first chamber (32) can be flanged to allow for removal for maintenance purposes. At least one choke nozzle, and in this instance two choke nozzles (34) of the type shown in FIG. 1 are located in a floor (35) of the chamber, leading to a second chamber (36) which is similar to the first chamber. A similar arrangement of choke nozzles (37) is positioned in the floor of the second chamber with its axis on the centre line of the upstream choke nozzles (34) and are spaced apart so that the distance between the exit of an upstream nozzle and the upper portion of the downstream nozzle is equivalent to from about 1 to 3, and more particularly about 2 to 3 diameters of the upstream nozzle exit.

Additional chambers with choke nozzles or mixing nozzles may be similarly arranged in a succession below those described above with the nozzles being positioned one below the other. In the wall of each chamber, in line with or slightly below the exit point of each nozzle, there is typically at least one inlet for the addition of one or more gases or liquids to the chamber preferably in a direction that results in swirling.

A further chamber (41) with a height of from about 0.4 m to about 1 m, and more particularly from about 0.6 m to about 1 m receives the fluid from the last of a succession of nozzles. This further chamber (41) is closed at its base but has a pair of opposite tangential outlets (42) located in the side wall. Those tangential outlets (42) lead to yet a further in line chamber (44), via a conduit (45) laterally offset from the first and second chambers, and a return tangential inlet (46) that may have a choke nozzle (47), which is of the same type described above. The choke nozzle (47) is typically positioned within the return inlet (46) as close as possible to the in line chamber (44). There may be a plurality of choke nozzles arranged in parallel depending on the flow rate to be accommodated.

In the wall of inlet (46), at or about a point where the exit of the nozzle (47) is positioned, there is typically at least one inlet (48) for the addition of one or more gases or liquids. The height of in line chamber (44) can be from about 0.4 m to about 1 m, and more particularly from about 0.8 m to about 1 m. The in line chamber (44) has a closed roof and has choke nozzles (51) of the type described above in its floor, leading to yet a further chamber. A succession of chambers (52) may follow as described above with gas inlets (53) provided, as may be required, at the outlets of the choke nozzles. The final set of nozzles may be mixing nozzles of the elongated variety described above with reference to FIG. 2. They may be positioned from about 2 to about 10, and more particularly from about 3 to about 10, nozzle exit diameters away from the exits from the upstream choke nozzles.

The mixing nozzles discharge into a relatively large chamber (54) compared to the previous chambers from which an exit conduit (55) extends. The length of the exit conduit is typically from about 0.4 m to about 1 m, and more particularly from about 0.5 m to about 1 m. The exit conduit may feed tangentially or in Tee fashion into an outlet chamber (56) that has a bottom discharge outlet (57).

Rubber bellows or elephant hose (not shown) may be installed at any interface between pipework feeding fluid to the apparatus of the invention and discharging the fluid away from the apparatus. The rubber bellows would absorb unwanted vibration and so assist with protecting the integrity of welds or joins and the sturdiness of the apparatus.

In use, a fluid of milled ore, water and calcium cyanide or sodium cyanide may be fed into the first chamber (32) through the inlet pipe (31). The velocity of the fluid at its entry into the chamber should be in the range of from about 1.5 m/s to about 25 m/s, and more particularly in the range of about 2.5 m/s to about 25 m/s. At a point just before the entry point the back-pressure of the fluid should be about 3 to about 10 bar, and more particularly about 5 to about 10 bar. Gases or other liquids can be injected into the fluid at or near this point through entry points described above. The gases or liquids should be pressurized to pressures of from about 5 to about 20 bar, and more particularly from about 10 to about 20 bar, and can be injected either directly into the fluid or via a nozzle arrangement.

The gases or liquids introduced downstream should also be pressurized to pressures of from about 5 to about 20 bar, and more particularly from about 10 to about 20 bar, and can be injected either directly into the fluid or via a nozzle arrangement, or could alternatively be self-aspirated owing to the vacuum created by the fluid flowing through the nozzle.

Figure 13:
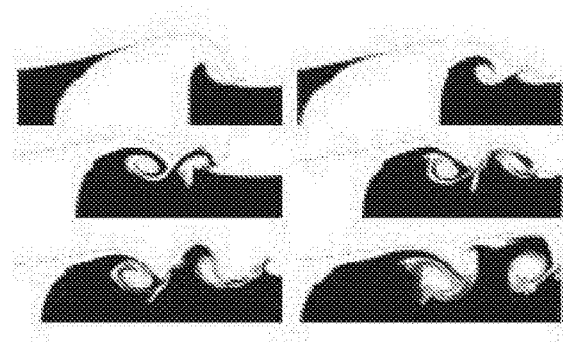
FIG. 13 illustrates how gas entrapment can occur through splashing of fluid out of a receiving cup of a nozzle.
Figure 14:
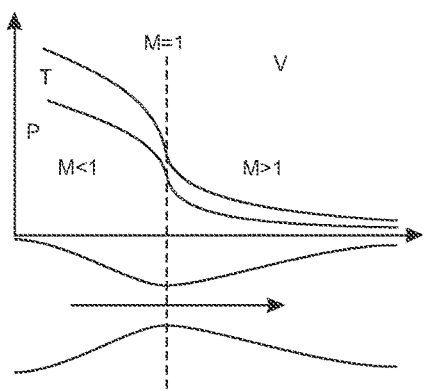
FIG. 14 shows a diagram of flow through a de Laval nozzle, showing approximate flow velocity (v), together with the effect on temperature (T) and pressure (P)
Figure 15:
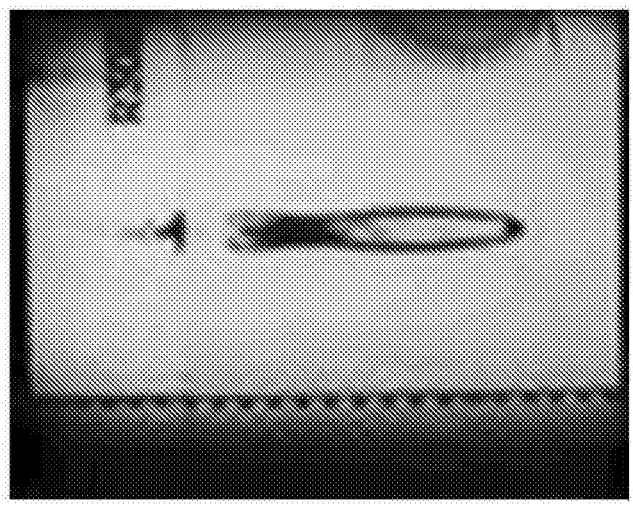
FIG. 15 illustrates gas entrapment by a droplet entering a stationary pool of liquid.

Gas entrapment can occur within or between the nozzles via one or more of the following mechanisms through turbulence within the jet exiting a nozzle (FIG. 12); through the shear layer surrounding the jet exiting the nozzle (FIG. 12); through the recirculating eddies between the jet exiting the nozzle and the liquid/suspension in the receiving pool of the nozzle located below it; between the wall of the receiving cup of the nozzle located below the jet and the liquid/suspension in the cup of the receiving nozzle; by splashing of liquid/suspension out of the receiving pool (FIG. 13).

Figure 7:
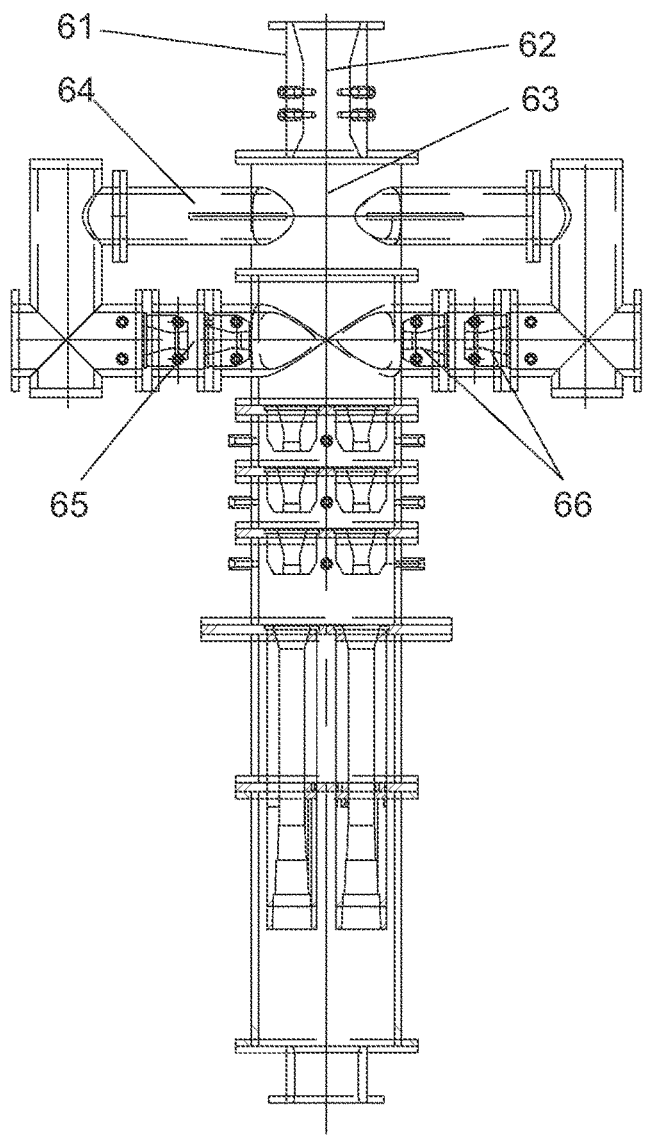
FIG. 7 is a schematic sectional elevation of an alternative embodiment of an apparatus according to the invention using a single axial mixing nozzle as its inlet.
Figure 8:
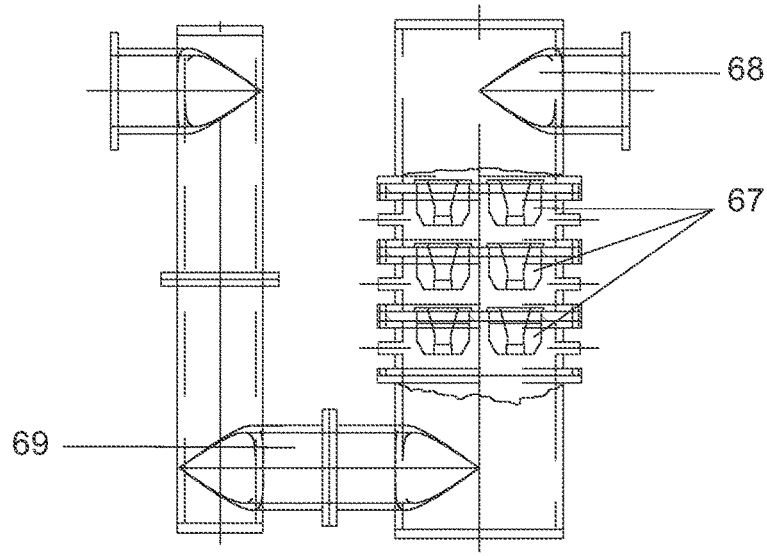
FIG. 8 is a schematic sectional elevation of an alternative and simplified embodiment of apparatus according to the invention.

Other embodiments of the invention are depicted in FIGS. 7 and 8. FIG. 7 shows a simplified embodiment of the invention, incorporating only a plurality of choke nozzles as illustrated in FIG. 5 for a more compact design. FIG. 7 also shows a coaxial inlet (61) in which there is installed a mixing nozzle (62). An inlet chamber (63) communicates directly with an arrangement of tangential outlets (64) and tangential inlet (65) with reference to FIG. 5. The choke nozzles are indicated by numeral (66).

FIG. 8 shows a more simplified arrangement in which there are simply three layers of choke nozzles (67) between a Tee inlet (68) and a Tee outlet (69).

The process and apparatus of the present invention can be arranged to result in an increased rate of cyanide destruction compared to known processes.

The commercially accepted process for cyanide destruction utilises a combination of $SO_2$ and air with a $CuSO_4$ catalyst in a well-agitated tank to oxidise cyanide to cyanate and so "destroy" the cyanide. One of the shortcomings of this process is the high reagent consumption. Some minerals also compete for the $SO_2$, resulting in unsuccessful destruction of the cyanide to the accepted industry standard of 50 ppm.

The reactor of the present invention can be used in the following two-stage process in the first of which the pH and Eh adjustment is carried out utilizing the reactor (with air or oxygen injection into the reactor) in addition to an Eh modifier such as $SO_2$/air and a catalyst such as copper sulphate. Other Eh modifiers such as peroxide, manganese dioxide, sodium hypochlorite, potassium permanganate, potassium dichromate or ozone may also be utilized. In a second stage oxidation of cyanide by carbon catalysis utilizing activated carbon such as that used in a carbon in leach plant is carried out.

In its simplest form, the two stage mechanism described above can be performed simultaneously in a single tank, with appropriate screening technology utilized to prevent the carbon from entering the reactor. Pumping of carbon through the reactor would result in undesirable increased carbon abrasion and breakage, with loss of potentially gold bearing carbon to tailings.

When the $SO_2$/air with copper sulphate catalyst, together with carbon catalyzed cyanide destruction, are used in the above process, it represents a hybrid between the known INCO process (as described in U.S. Pat. No. 4,537,686) and the Maelgwyn process (US Publication Number 2010/0307977). This hybrid process uses significantly less reagents than required for the INCO process (as little as one tenth of the INCO reagents).

The hybrid process also employs the catalytic effect of activated carbon to ensure the destruction of cyanide via two different mechanisms ($SO_2$/air and activated carbon catalysis). The process is able to reduce the residence time required in the Maelgwyn process, with a positive Eh value for successful destruction, and also results in the simultaneous leaching and recovery of precious metals such as gold, by adsorption onto the carbon.

More importantly, the hybrid process as described above can be performed in a single stage, as opposed to the multiple stages required for the Maelgwyn Process.

Figure 16:
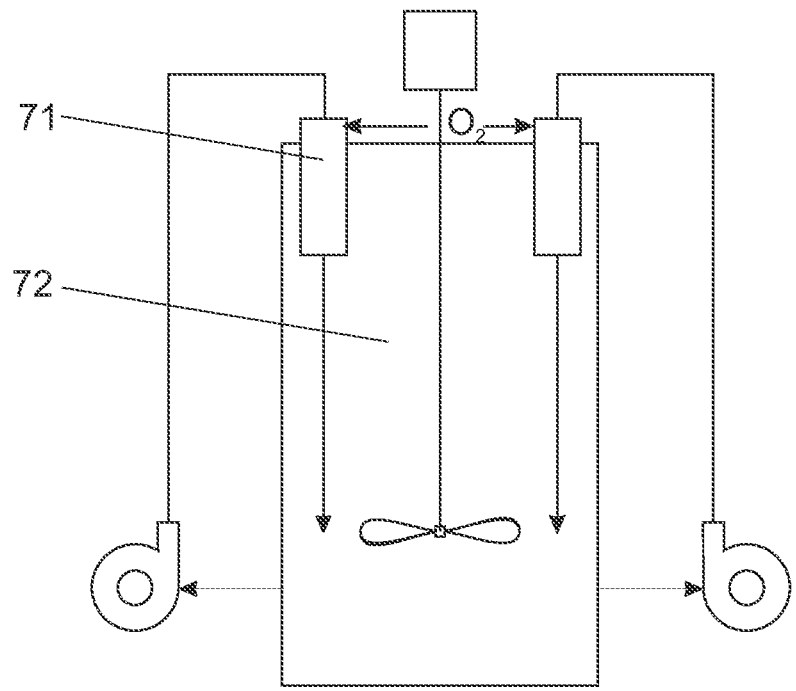
FIG. 16 is a block diagram of a possible two-stage process for using apparatus of the present invention in association with a single tank.

FIG. 16 shows a flow diagram of how the reactor of the present invention can be integrated into a carbon in leach plant. A reactor (71) according to the invention can be installed in the first two tanks (72) to reduce reagent consumption and accelerate leach kinetics. This could free up the last two tanks to be utilized for cyanide destruction and arsenic and heavy metal removal. In addition to catalyzing the leach reaction, the carbon in the last tank would also ensure that soluble gold losses are kept to a minimum.

A test was conducted using a standard $SO_2$/air cyanide destruction process as described in U.S. Pat. No. 4,537,686 in a single 60 minute stage with standard reagent addition (2:1 stoichiometric ratio of $SO_2$ to cyanide) (Table 1), and this was compared to the hybrid process of the present invention as described above for the same time period (Table 2). From similar weak acid dissociable cyanide starting values, the process of the present invention resulted in lower final cyanide values than the $SO_2$/air process and utilized only one tenth of the reagents used in the $SO_2$/air process.

TABLE 1

Cyanide destruction using a commercial $SO_2$/Air process

| | SO2/Air | | |
|---|---|---|---|
| | Reagent/CN | | Stage 1 |
| | Free CN | ppm | 94 |
| | WAD CN | ppm | 96 |
| | Thiocyanate | ppm | 5.8 |
| | Total CN | ppm | 97 |
| Test | Slurry Flow Rate | mL/min | 16 |
| Conditions | Solid Flow Rate | g/min | 10.1 |
| | Stage Residence Time | min | 60 |
| | pH | | 9.25 |
| | Eh | mV | 136 |
| 4-5 Hours | SMBS | g/t | 992 |
| | CuSO4•5H2O | g/t | 258 |
| | Lime | g/t | 488 |
| | Free CN | ppm | 0.03 |
| | WAD CN | ppm | 0.07 |
| | Thiocyanate | ppm | 4.7 |
| | Total CN | ppm | 0.64 |

TABLE 2

Cyanide destruction using the process of the present invention.

| | Gold Ore Hybrid Detox | | |
|---|---|---|---|
| | Data | | Stage 2 |
| | Free CN | ppm | 26 |
| | WAD CN | ppm | 98 |
| | Thiocyanate | ppm | 4.2 |
| | Total CN | ppm | 41 |
| Test | Slurry Flow Rate | mL/min | 9.1 |
| Conditions | Solid Flow Rate | g/min | 5.49 |
| | Stage Residence Time | min | 30 |
| | pH | | 8.68 |
| | Eh | mV | 101 |
| 6-7.5 Hours | SMBS | g/t | 118 |
| | CuSO4•5H2O | g/t | 226.8 |
| | H2SO4 | g/t | 44 |
| | Free CN | ppm | 0.04 |
| | WAD CN | ppm | 0.03 |
| | Thiocyanate | ppm | 1.2 |
| | Total CN | ppm | 0.08 |

These tests were repeated under the same conditions but using a feed material of different mineralogy (Tables 3 and 4). The commercial $SO_2$/air process was unable to render a final cyanide value of below 50 ppm, which is an industry regulated standard for effluent discharge.

TABLE 3

Cyanide destruction using a commercial SO$_2$/air process

SO2/Air

| | | Reagent/CN | | Stage 1 |
|---|---|---|---|---|
| Test Conditions | | WAD CN | ppm | 163 |
| | | Total CN | ppm | 173 |
| | | Slurry Flow Rate | mL/min | 16 |
| | | Solid Flow Rate | g/min | 10.1 |
| | | Stage Residence Time | min | 60 |
| | | pH | | 9.25 |
| | | Eh | mV | 136 |
| 4-5 Hours | | SMBS | g/t | 1580 |
| | | CuSO4•5H2O | g/t | 60 |
| | | Lime | g/t | 530 |
| | | WAD CN | ppm | 77 |
| | | Total CN | ppm | 87 |

TABLE 4

Cyanide destruction using the process of the present invention

Gold Ore Hybrid Detox

| | | Reagent/CN | | Stage 2 |
|---|---|---|---|---|
| Test Conditions | | WAD CN | ppm | 164 |
| | | Total CN | ppm | 173 |
| | | Slurry Flow Rate | mL/min | 16 |
| | | Solid Flow Rate | g/min | 10.1 |
| | | Stage Residence Time | min | 30 |
| | | pH | | 8.52 |
| | | Eh | mV | 88 |
| 4-5 Hours | | SMBS | g/t | 250 |
| | | CuSO4•5H2O | g/t | 60 |
| | | H2SO4 | g/t | 51 |
| | | WAD CN | ppm | 12 |
| | | Total CN | ppm | 17 |

The process of the present invention thus not only has the potential to be significantly more cost effective and environmently friendly than existing technologies, but is also potentially technically superior.

Figure 17:
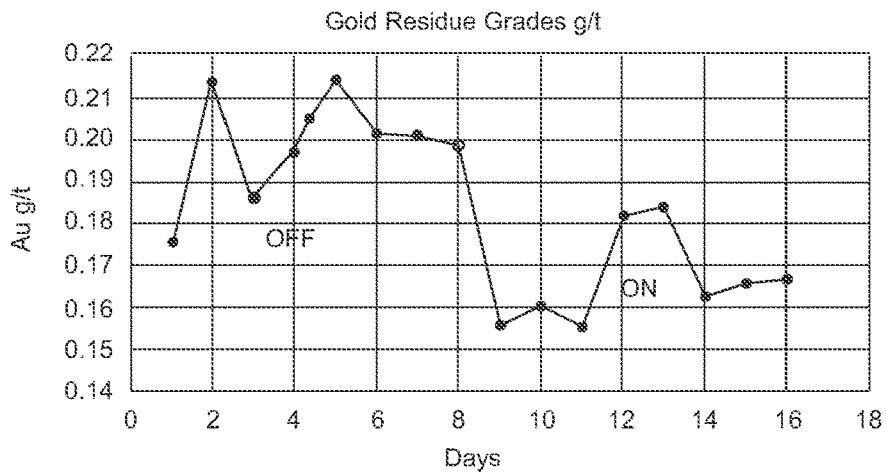
FIG. 17 is a graph showing results of a practical test for demonstrating the efficacy of the invention as applied to the leaching of gold.
Figure 18:
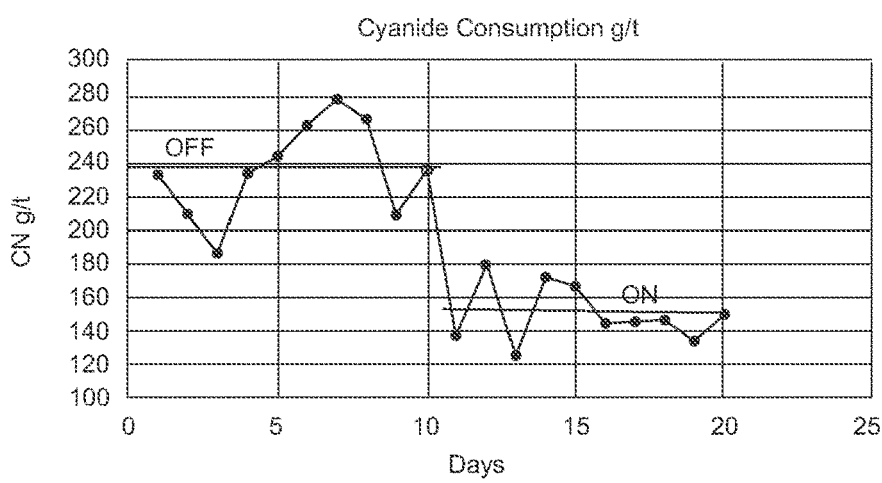

Subsequently an industrial scale plant trial was carried out over a period of 20 days of the first 10 days being run with the reactor of this invention is switched off and the second 10 days being run with the reactor switched on. The gold residue results are shown in FIG. 17 and the cyanide consumption results are shown in FIG. 18. There is a distinct improvement of a reduction in the residual gold in the residue of naught 0.32 g/t and an improvement in the cyanide consumption of 84 g/t which was a reduction of 36%.

The foregoing relates mostly to the introduction of gas such as an oxidizing gas into a fluid. However, there are other applications of the invention in which the introduction of gas is not necessary, and one of these is in the destruction of arsenic removal.

Arsenic occurs naturally in underground rock in a stable form which doesn't dissolve in water. However, when the rock is mined and the ore is brought to the surface and into contact with air, the arsenic is converted to an unstable form which readily dissolves in water. Thus, wastewater from mining operations frequently contains high concentrations of arsenic. As arsenic is toxic to both humans and animals, steps need to be taken to reduce the risks of contamination of groundwater from the wastewater, and the internationally acceptable upper limit for arsenic in wastewater from mining operations is presently set at 0.1 ppm. Mining operations which produce wastewater with higher levels of arsenic generally need to line their tailings dams with a layer of plastic to prevent any possible contaimination of the environment. This is not only very expensive, but also does not prevent or reduce the creation of toxic waste.

A reactor of the present invention can be used to leach the arsenic out of the native mined mineral ore and into solution within a relatively short period of a few hours. The dissolved arsenic can then be precipitated out of the solution as scorodite, a stable form of arsenic which does not dissolve in water and is therefore not toxic, or a scorodite-like mineral.

The arsenic remediation can be carried out as an initial step prior to metal extraction utilising a mechanically agitated tank with a reactor on recirculation with air or oxygen addition into the reactor (ozone may also be used). In order to effect the leaching of the arsenic, the following reagents may be employed sodium metabisulphite (SMBS) or caustic soda (NaOH); and hydrochloric acid (HCl) or sulphuric acid ($H_2SO_4$);

Ferric chloride can be used to effect the precipitation of arsenic as stable scorodite or scorodite-like minerals.

Two tests were conducted on gold ore containing reactive Gersdorffite and nickeline, both of which are unstable forms of arsenic.

The first test was conducted under the following standard gold leaching conditions to serve as a control or base case: 24 hour leach time; 5 kg/t NaCN addition; 10 g/l carbon addition; 40% solids; test conducted in agitated vat.

The second test utilized the same leach conditions as the first, but with a prior arsenic leaching and precipitation stage conducted under the following conditions: 800 g/t SMBS; 300 g/t copper sulphate; 2 kg/t HCl; 50 g/t phosphoric acid; 50 g/t alum; 300 g/t ferric chloride; 4 hour residence time; 40% solids; 10 reactor passes with oxygen addition (one pass equals one vessel volume turnover); test conducted in agitated vat.

The results of these tests are shown in Table 5. JR691 is the control/base test and JR689 is the test incorporating the arsenic leaching and precipitation according to the invention.

TABLE 5

Arsenic and residual gold values after gold leaching

| | Au ppm | Au ppm rpt1 | Au ppm rpt2 | Au ppm rpt3 | Au ppm rpt4 | Au ppm rpt5 | Au ppm Average | As mg/l soln |
|---|---|---|---|---|---|---|---|---|
| JR689 24 hrs RESI | 0.65 | 0.59 | 0.58 | 0.58 | 0.60 | 0.62 | 0.60 | <0.10 |
| JR691 24 hrs RESI | 0.95 | 0.98 | 0.97 | 1.00 | 0.94 | 1.03 | 0.98 | 1.30 |

The process incorporating the arsenic leaching and precipitation step resulted in arsenic in solution values below detection at less than 0.1 ppm arsenic at the end of the leach. The control/base test, however, showed 1.30 ppm arsenic at the end of the leach. This is significant, as the arsenic values of the control/base test do not comply with environmental regulations whereas the process incorporating the arsenic leaching and precipitation step of this invention is environmentally compliant.

In addition, the process incorporating the arsenic leaching and precipitation step had a gold residue 0.38 g/t lower than the base/control test, which provides a significant economic benefit and a valuable boost to gold production levels.

Thus, the reactor of the present invention can be used to leach out and precipitate arsenic from minerals, so rendering the arsenic more stable and resulting in little or no further leaching of arsenic when deposited on tailings storage facilities. This results in compliance with regulations relating to arsenic levels in groundwater and discharge into natural waterways. The process can also provide higher levels of gold recovery.

Figure 19:
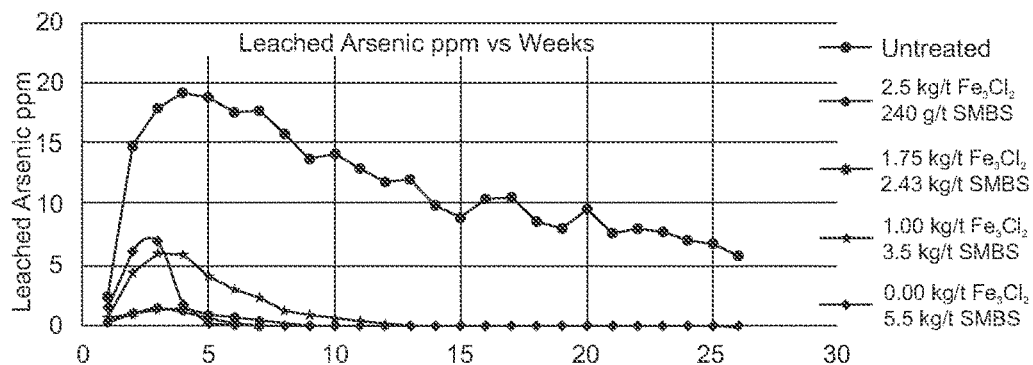

The results of an industrial scale test are shown in FIG. 19 for four different conditions namely an untreated condition and four different conditions involving a process according to the invention equating to 3 reactor passes for a duration of 4 hours with different additions of ferric chloride and sodium metabisulphite (SMBS), as reflected in FIG. 19. The additions were 2.5 kg/t ferric chloride and 240 g/t SMBS; 1.75 kg/t ferric chloride and 2.23 kg/t SMBS; 1.00 kg/t ferric chloride and 3.5 kg/t SMBS; and 0.00 kg/t ferric chloride and 5.5 kg/t SMBS.

Numerous other processes can doiubtless be carried out using the apparatus and process of this invention

The invention claimed is:

1. A process for enhancing chemical or physical reactions occurring in processes in which a slurry and a gas are contacted such that at least a component of the gas partakes in a physical or chemical reaction with at least one component of the slurry with the gas in the form of bubbles entrained in the slurry, wherein the size of the gas bubbles is reduced by utilizing choked flow, the process comprising passing the slurry from a first chamber to a second chamber through a choke nozzle comprising a converging section, a throat section, a backward-facing step immediately after the throat section and an exit section wherein the directional flow, angular velocity, centrifugal acceleration and straight line acceleration of the slurry create conditions providing cavitation consequent on choked flow through the choke nozzle wherein the process includes diffusing a gas in the slurry and generating bubbles in the slurry that accelerate through the throat section to cause the bubbles to implode and form multiple smaller bubbles, the process being characterized in that the gas is introduced through one or more gas inlets having their axes extending transversely at an offset in a generally tangential direction relative to slurry flow so that a swirling action of diffusing gas in the slurry results.

2. A process as claimed in claim 1 in which the process forms part of a process for separating gold and other metals from ore in which oxygen or air is diffused within a slurry of milled ore, water and calcium cyanide or sodium cyanide so as to sufficiently oxidize the ore for reduced cyanide consumption, improved metal leaching or to facilitate flotation of the gold particles from the ore.

3. A process as claimed in claim 1 in which the converging section, the throat and the exit section of the choke nozzle are each of circular shape in cross-section, and the exit section diverges.

4. A process as claimed in claim 1 in which the slurry and gas are passed through at least one mixing nozzle selected from before they enter a choke nozzle; after they leave a choke nozzle, and both before and after a choke nozzle; and wherein a mixing nozzle has a converging section at its entrance, a throat section, a backward-facing step immediately after the throat section, and an exit section at its exit which opens into a downstream chamber.

5. A process as claimed in claim 1 in which in which the converging section of a choke nozzle has a cone angle of from 1 to 35 degrees.

6. A process as claimed in claim 5 in which the cone angle is from 15 to 30 degrees.

7. A process as claimed in claim 1 in which the backward-facing step of a choke nozzle extends radially outwards beyond the throat section by 3 to 10% of the diameter of the throat.

8. A process as claimed in claim 7 in which the backward-facing step extends radially outwards beyond the throat section by from 4 to 8%.

9. A process as claimed in claim 1 in which the exit section of the choke nozzle diverges with a cone angle of from 1 to 8 degrees.

10. A process as claimed in claim 9 in which the exit section diverges with a cone angle of from 2 to 8 degrees.

11. A process as claimed in claim 1 in which a diverging exit section to a choke nozzle has additional successive backward-facing steps along the exit section.

* * * * *